(12) United States Patent
Escale et al.

(10) Patent No.: US 10,920,062 B2
(45) Date of Patent: Feb. 16, 2021

(54) COMPOSITION COMPRISING A MULTISTAGE POLYMER AND TWO DIFFERENT (METH)ACRYLIC POLYMERS, ITS METHOD OF PREPARATION AND ARTICLE COMPRISING IT

(71) Applicant: Arkema France, Colombes (FR)

(72) Inventors: Pierre Escale, Pau (FR); Pierre Gerard, Denguin (FR); Aline Couffin, Balsac (FR); Raber Inoubli, Villeurbanne (FR)

(73) Assignee: Arkema France, Colombes (FR)

( * ) Notice: Subject to any disclaimer, the term of this patent is extended or adjusted under 35 U.S.C. 154(b) by 39 days.

(21) Appl. No.: 16/311,775

(22) PCT Filed: Jun. 29, 2017

(86) PCT No.: PCT/EP2017/066199
§ 371 (c)(1),
(2) Date: Dec. 20, 2018

(87) PCT Pub. No.: WO2018/002259
PCT Pub. Date: Jan. 4, 2018

(65) Prior Publication Data
US 2019/0211198 A1     Jul. 11, 2019

(30) Foreign Application Priority Data

Jun. 29, 2016  (FR) .................................... 16 56097

(51) Int. Cl.
| | | |
|---|---|---|
| *C08L 33/12* | (2006.01) | |
| *C08F 265/06* | (2006.01) | |
| *C08F 285/00* | (2006.01) | |
| *C08L 9/00* | (2006.01) | |

(52) U.S. Cl.
CPC ............ *C08L 33/12* (2013.01); *C08F 265/06* (2013.01); *C08F 285/00* (2013.01); *C08L 9/00* (2013.01); *C08L 2205/025* (2013.01)

(58) Field of Classification Search
CPC ...... C08F 265/06; C08F 285/00; C08L 33/12; C08L 33/08; C08L 33/10; C08L 2205/025; C08L 9/00
See application file for complete search history.

(56) References Cited

U.S. PATENT DOCUMENTS

| | | |
|---|---|---|
| 9,296,845 B2 | 3/2016 | Choi et al. |
| 2006/0128892 A1 | 6/2006 | Hidalgo et al. |
| 2014/0062121 A1 | 3/2014 | Benz et al. |
| 2016/0017138 A1* | 1/2016 | Gerard ...................... C08J 5/24 525/94 |

* cited by examiner

*Primary Examiner* — Nathan M Nutter
(74) *Attorney, Agent, or Firm* — Thomas F. Roland

(57) ABSTRACT

The present invention relates to a composition comprising two different (meth)acrylic polymers and a multistage polymer. In particular the present invention it relates to polymeric composition comprising two different (meth)acrylic polymers and a multistage polymer. The invention also relates to a process for manufacturing such polymeric composition. More particularly the present invention relates also to a process for preparing an impact modified composition comprising two different (meth)acrylic polymers and a multistage polymer.

16 Claims, No Drawings

COMPOSITION COMPRISING A MULTISTAGE POLYMER AND TWO DIFFERENT (METH)ACRYLIC POLYMERS, ITS METHOD OF PREPARATION AND ARTICLE COMPRISING IT

This application claims benefit, under U.S.C. § 119 or § 365 of PCT Application Number PCT/EP2017/066199, filed Jun. 29, 2017, and French Patent Application Number FR16.56097, filed Jun. 29, 2016, these documents being incorporated herein by reference.

FIELD OF THE INVENTION

The present invention relates to a composition comprising two different (meth)acrylic polymers and a multistage polymer.

In particular the present invention it relates to polymeric composition comprising two different (meth)acrylic polymers and a multistage polymer. The invention also relates to a process for manufacturing such polymeric composition.

More particularly the present invention relates also to a process for preparing an impact modified composition comprising two different (meth)acrylic polymers and a multistage polymer.

TECHNICAL PROBLEM

Impact modifiers or impact additives are widely used to improve the impact strength for polymeric compositions with the aim to compensate their inherent brittleness or the embrittlement that occurs at ambient temperature but also and especially subzero temperatures, notch sensitivity and crack propagation. So an impact modified polymer is a polymeric material whose impact resistance and toughness have been increased by the incorporation of phase micro domains of a rubbery material.

This is usually done due to the introduction of microscopic rubber particles into the polymer matrix that can absorb the energy of an impact or dissipate it. One possibility is to introduce the rubber particles in form of core-shell particles. These core-shell particles that possess very generally a rubber core and a polymeric shell, having the advantage of a proper particle size of the rubber core for effective toughening and the grafted shell in order to have the adhesion and compatibility with the thermoplastic matrix.

The performance of the impact modification is a function of the particles size, especially of the rubber part of the particle, and its quantity. There is an optimal average particle size in order to have the highest impact strength for a given quantity of added impact modifier particles.

These primary impact modifier particles are usually added in form of powder particles to the polymeric material. These powder particles are agglomerated primary impact modifier particles. During the blending of the thermoplastic material with the powder particles the primary impact modifier particles are regained and are dispersed more or less homogenously dispersed in the thermoplastic material.

While the particle size of the impact modifier particles in the range of nanometers, the range of the agglomerated powder particles is in the range of micrometers. Latter is much easier for handling.

For many polymers, thermoplastic but also thermoset polymers it is very difficult to disperse correctly these multistage polymer in form of core shell particles as agglomerated dry powders. An ideal homogenous dispersion of the core-shell particle has no agglomerates after the dispersion in the thermoplastic material also called matrix.

This is even more difficult if the multistage polymers should be homogenously distributed in if added in a large quantity. Adding large quantities is also problematic when the multistage polymer is added in a liquid composition comprising monomer or monomers.

In a liquid composition the impact modifier particles can swell, increasing their effective volume and in the end increasing considerably the viscosity of the liquid composition. In order to have a liquid composition with a sufficient fluidity for the application it is necessary to limit the quantity of impact modifier particles in the liquid composition, yielding to worse or not sufficient impact performance.

The impact strengthening in the case of poly methyl methacrylate (PMMA) is generally improved by virtue of the introduction into the acrylic resin of an impact additive, known as core-shell additive, which is provided in the form of multilayer spherical particles. These particles are prepared by emulsion polymerization in a multistage process and are recovered in the powder form by atomization. They generally comprise a sequence of "hard" and "soft" layers. It is thus possible to find two-layer (soft-hard) or three-layer (hard-soft-hard) particles or sometimes even more. In the case of cast acrylic sheets, obtained by polymerization of the mixture of monomers in a mold, the impact additive is dispersed beforehand in the mixture of monomers. In the case of extruded acrylic sheets, the impact additive is compounded in the extruder with the acrylic resin. In both cases, it is necessary for the impact additive to be well dispersed within the acrylic resin in order to maintain an unchanging and homogeneous level of impact strength.

The objective of the present invention is to obtain composition comprising a first (meth)acrylic polymer, a second (meth)acrylic polymer and a multistage polymer, with a homogenous dispersion of the multistage polymer in order to have a composition with a sufficient high ratio of multistage polymer for impact performance.

An objective of the present invention is also to have a composition comprising a first (meth)acrylic polymer, a second (meth)acrylic polymer and a multistage polymer, with a homogenous dispersion of the multistage polymer, said composition can be used in process for manufacturing impact modified articles.

Another objective of the present invention is to avoid or reduce significantly the agglomeration of multistage polymer at high level in methacrylic polymer(s).

Still an additional objective is having a process for preparing a composition comprising a first (meth)acrylic polymer, a second (meth)acrylic polymer and a multistage polymer, with a homogenous dispersion of the multistage polymer at high level in methacrylic polymer(s).

Still a further objective is the use of the composition comprising comprising a monomer, a (meth)acrylic polymer for the impact modification of polymers and especially polymer sheets made by cast polymerization.

BACKGROUND OF THE INVENTION

Prior Art

The document WO2012/130595 discloses the use of coated mouldings consisting of impact modified polymethylmethacrylate polymers with high molecular mass as windows for passenger cars or utility vehicles. A moulding composition is disclosed comprising 0.5 to 35 wt % of at least one core-shell-shell particle as impact modifier.

The document WO2012/085487 discloses the transparent and impact-resistant crosslinked acrylic composition consisting of a brittle matrix having a glass transition temperature of greater than 0° C. and of elastomeric domains having a characteristic dimension of less than 100 nm consisting of macromolecular sequences having a flexible nature with a glass transition temperature of less than 0° C., where the elastomeric domain are part of a blockcopolymer made by PRC. No multistage polymer is used in that composition.

The document 2004/037921 discloses ductile and transparent compositions comprising an amorphous matrix and a block copolymer. Additionally the composition comprise core shell polymer.

The document WO2014/135815 discloses a liquid (meth)acrylic syrup for impregnation of a fibrous substrate, said syrup comprises a) (meth)acrylic polymer, b) a (meth)acrylic monomer and c) elastomeric domains. The elastomeric domains are part of a block copolymer.

None of the prior art documents discloses a polymeric composition as claimed or a process for obtaining it or its use.

BRIEF DESCRIPTION OF THE INVENTION

Surprisingly it has been found that a polymeric composition comprising
  a) a (meth)acrylic polymer (P1),
  b) a multistage polymer and
  c) a (meth)acrylic polymer (P2),
characterized that the (meth)acrylic polymer (P1) has a mass average molecular weight Mw of less than 100 000 g/mol, has a better dispersion of the multistage polymer than a composition not comprising the (meth)acrylic polymer (P1) at same weight quantity of multistage polymer.

Surprisingly it has also been found that a polymeric composition comprising
  a) a (meth)acrylic polymer (P1),
  b) a multistage polymer and
  c) a (meth)acrylic polymer (P2),
characterized that the (meth)acrylic polymer (P1) has a mass average molecular weight Mw of less than 100 000 g/mol, possesses a better dispersion of the multistage polymer than a composition not comprising the (meth)acrylic polymer (P1) and a good impact performance.

Surprisingly it has also been found that a polymeric composition comprising
  a) a (meth)acrylic polymer (P1),
  b) a multistage polymer and
  c) a (meth)acrylic polymer (P2),
characterized that the (meth)acrylic polymer (P1) has a mass average molecular weight Mw of less than 100 000 g/mol, can be used for manufacturing impact modified articles.

Surprisingly it has also been found that a process for manufacturing a polymeric composition comprising the steps of
  a) preparing a composition comprising a (meth)acrylic polymer (P1) having a mass average molecular weight Mw of less than 100 000 g/mol and a multi stage polymer,
  b) mixing the composition of previous step with a (meth)acrylic polymer (P2);
yields to a better dispersion of the multistage polymer in the composition than a composition not comprising the (meth)acrylic polymer (P1).

Surprisingly it has also been found that a process for manufacturing a polymeric composition comprising the steps of
  a) preparing a composition comprising a (meth)acrylic polymer (P1) having a mass average molecular weight Mw of less than 100 000 g/mol and a multi stage polymer,
  b) mixing the composition of previous step with a (meth)acrylic polymer (P2);
yields to a better dispersion with a high amount of the multistage polymer in the composition than a composition not comprising the (meth)acrylic polymer (P1).

Surprisingly it has also been found that a process for manufacturing a composition comprising the steps of
  a) preparing a composition comprising a (meth)acrylic polymer (P1) having a mass average molecular weight Mw of less than 100 000 g/mol and a multi stage polymer,
  b) mixing the composition of previous step with a monomer (M1);
characterized that the (meth)acrylic polymer (P1) has a mass average molecular weight Mw of less than 100 000 g/mol, yields to a better dispersion of the multistage polymer at a higher level than a composition not comprising the (meth)acrylic polymer (P1) at same weight quantity of multistage polymer.

DETAILED DESCRIPTION OF THE INVENTION

According to a first aspect, the present invention relates to a polymeric composition comprising
  a) a (meth)acrylic polymer (P1),
  b) a multistage polymer and
  c) a (meth)acrylic polymer (P2),
characterized that the (meth)acrylic polymer (P1) has a mass average molecular weight Mw of less than 100 000 g/mol.

According to a second aspect, the present invention relates to polymeric composition comprising
  a) a (meth)acrylic polymer (P1),
  b) a multistage polymer and
  c) a (meth)acrylic polymer (P2),
characterized that the (meth)acrylic polymer (P1) has a mass average molecular weight Mw of less than 100 000 g/mol and that the (meth)acrylic polymer (P2) has mass average molecular weight Mw more important than the (meth)acrylic polymer (P1).

In a third aspect the present invention relates to a process for manufacturing a polymeric composition comprising the steps of
  a) preparing a composition comprising a (meth)acrylic polymer (P1) having a mass average molecular weight Mw of less than 100 000 g/mol and a multi stage polymer,
  b) mixing the composition of previous step with a (meth)acrylic polymer (P2).

In a fourth aspect the present invention relates to a process for manufacturing a polymeric composition comprising the steps of
  a) preparing a composition comprising a (meth)acrylic polymer (P1) having a mass average molecular weight Mw of less than 100 000 g/mol and a multi stage polymer,
  b) mixing the composition of previous step with a monomer (M1) chosen from a (meth)acrylic monomer or a vinyl monomer or mixture thereof;
  c) polymerizing the monomer (M1).

In a fifth aspect the present invention relates to the use a polymeric composition comprising
 a) a (meth)acrylic polymer (P1),
 b) a multi stage polymer and
 c) a (meth)acrylic polymer (P2);
characterized that the (meth)acrylic polymer (P1) has a mass average molecular weight Mw of less than 100 000 g/mol, for manufacturing impact modified polymeric articles.

By the term "polymer powder" as used is denoted a polymer comprising powder grain in the range of at least 1 micrometer (jim) obtained by agglomeration of primary polymer comprising particles in the nanometer range.

By the term "primary particle" as used is denoted a spherical polymer comprising particle in the nanometer range. Preferably the primary particle has a weight average particle size between 20 nm and 800 nm.

By the term "particle size" as used is denoted the volume average diameter of a particle considered as spherical.

By the term "copolymer" as used is denoted that the polymer consists of at least two different monomers.

By "multistage polymer" as used is denoted a polymer formed in sequential fashion by a multi-stage polymerization process. One preferred process is a multi-stage emulsion polymerization process in which the first polymer is a first-stage polymer and the second polymer is a second-stage polymer, i.e., the second polymer is formed by emulsion polymerization in the presence of the first emulsion polymer.

By the term "(meth)acrylic monomer" as used is denoted all kind of acrylic and methacrylic monomers.

By the term "(meth)acrylic polymer" as used is denoted that the (meth)acrylic) polymer comprises essentially polymers comprising (meth)acrylic monomers that make up 50 wt % or more of the (meth)acrylic polymer.

By the term "impact modifier" as used is understood a material that once incorporated in a polymeric material increases the impact resistance and toughness of that polymeric material by phase micro domains of a rubbery material or rubber polymer.

By the term "rubber" as used is denoted to the thermodynamic state of the polymer above its glass transition.

By the term "rubber polymer" as used is denoted a polymer that has a glass transition temperature (Tg) below 0° C.

With regard to the polymeric composition of the invention, it comprises a) a (meth)acrylic polymer (P1) having a mass average molecular weight Mw of less than 100 000 g/mol, b) a multistage polymer and c) a (meth)acrylic polymer (P2).

The relative weight quantity of the multistage polymer in the composition comprising the three components a), b) and c), is between 1 wt % and 50 wt %, preferably between 2 wt % and 35 wt %, more preferably between 5 wt % and 30 wt %, advantageously between 10 wt % and 30 wt %.

The relative weight ratio of the (meth)acrylic polymer (P1) in the composition comprising the three components a), b) and c), is 0.05 wt % and 36 wt % preferably between 0.1 wt % and 27 wt %.

The weight ratio of the two polymers, the multistage polymer and the (meth)acrylic polymer (P1) together, in the composition comprising the three components a), b) and c), is between 1.05 wt % and 50 wt %, preferably between 2.05 wt % and 40 wt %. In one embodiment the (meth)acrylic polymer (P2) in which is dispersed multistage polymer is a continuous phase.

The composition can comprise also other compounds, which are not taken into account for the calculation of the weight ratios between the three components or compounds a) b) and c).

By saying that a range from x to y in the present invention, it is meant that the upper and lower limit of this range are included, equivalent to at least x and up to y.

By saying that a range is between x and y in the present invention, it is meant that the upper and lower limit of this range are excluded, equivalent to more than x and less than y.

With regard to the (meth)acrylic polymer (P1), it has a mass average molecular weight Mw of less than 100 000 g/mol, preferably less than 90 000 g/mol, more preferably less than 80 000 g/mol, still more preferably less than 70 000 g/mol, advantageously less than 60 000 g/mol, more advantageously less than 50 000 g/mol and still more advantageously less than 40 000 g/mol.

The (meth)acrylic polymer (P1), it has a mass average molecular weight Mw above 2 000 g/mol, preferably above 3000 g/mol, more preferably above 4000 g/mol, still more preferably above 5 000 g/mol, advantageously above 6 000 g/mol, more advantageously above 6 500 g/mol and still more advantageously above 7 000 g/mol and most advantageously above 10 000 g/mol.

The mass average molecular weight Mw of (meth)acrylic polymer (P1) is between 2 000 g/mol and 100 000 g/mol, preferable between 3 000 g/mol and 90 000 g/mol and more preferably between 4 000 g/mol and 80 000 g/mol advantageously between 5000 g/mol and 70 000 g/mol, more advantageously between 6 000 g/mol and 50 000 g/mol and most advantageously between 10 000 g/mol and 40 000 g/mol.

Preferably the (meth)acrylic polymer (P1) is a copolymer comprising (meth)acrylic monomers. More preferably the (meth)acrylic polymer (P1) is a (meth)acrylic polymer. Still more preferably the (meth)acrylic polymer (P1) comprises at least 50 wt % monomers chosen from C1 to C12 alkyl (meth)acrylates. Advantageously preferably the (meth)acrylic polymer (P1) comprises at least 50 wt % of monomers chosen from C1 to C4 alkyl methacrylate and C1 to C8 alkyl acrylate monomers and mixtures thereof. More advantageously the (meth)acrylic polymer (P1) comprises at least 50 wt % of polymerized methyl methacrylate, and even more advantageously at least 60 wt % and most advantageously at least 65 wt %.

Preferably the glass transition temperature Tg of the (meth)acrylic polymer (P1) is between 30° C. and 150° C. The glass transition temperature of the (meth)acrylic polymer (P1) is more preferably between 40° C. and 150° C., advantageously between 45° C. and 150° C. and more advantageously between 50° C. and 150° C.

Preferably the polymer (meth)acrylic polymer (P1) is not crosslinked.

Preferably the polymer (meth)acrylic polymer (P1) is not grafted on any other polymer or polymers.

Preferably the (meth)acrylic polymer (P1) has a melt flow index (MFI) according to ISO 1133 (230° C./3.8 kg) of at least 5 g/10 min, preferably at least 6 g/10 min, more preferably at least 7 g/10 min and most preferably at least 8 g/10 min.

More preferably the (meth)acrylic polymer (P1) has a melt flow index (MFI) according to ISO 1133 (230° C./3.8 kg) according to between 5 g/10 min and 100 g/10 min, preferably melt flow index is between 6 g/10 min and 90 g/10 min, more preferably between 7 g/10 min and 80 g/10 min, advantageously between 8 g/10 min and 70 g/10 min.

In a first preferred embodiment the (meth)acrylic polymer (P1) comprises from 50 wt % to 100 wt % methyl methacrylate, preferably from 80 wt % to 100 wt % methyl methacrylate, still more preferably from 80 wt % to 99.8 wt % methyl methacrylate and from 0.2 wt % to 20 wt % of an C1 to C8 alkyl acrylate monomer. Advantageously the C1 to C8 alkyl acrylate monomer is chosen from methyl acrylate, ethyl acrylate or butyl acrylate.

In a second preferred embodiment the (meth)acrylic polymer (P1) comprises between 0 wt % and 50 wt % of a functional monomer. Preferably the (meth)acrylic polymer (P1) comprises between 0 wt % and 30 wt % of the functional monomer, more preferably between 1 wt % and 30 wt %, still more preferably between 2 wt % and 30 wt %, advantageously between 3 wt % and 30 wt %, more advantageously between 5 wt % and 30 wt % and most advantageously between 5 wt % and 30 wt %.

Preferably the functional monomer of the second preferred embodiment is a (meth)acrylic monomer. The functional monomer has the formula (1) or (2):

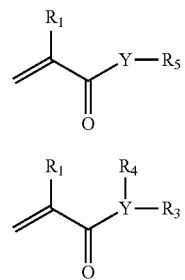

wherein in both formulas (1) and (2) $R_1$ is chosen from H or $CH_3$; and in formula (1) Y is O, $R_5$ is H or an aliphatic or aromatic radical having at least one atom that is not C or H; and in formula (2) Y is N and $R_4$ and/or $R_3$ is H or an aliphatic or aromatic radical.

Preferably the functional monomer (1) or (2) is chosen from glycidyl (meth)acrylate, acrylic or methacrylic acid, the amides derived from these acids, such as, for example, dimethylacrylamide, 2-methoxyethyl acrylate or methacrylate, 2-aminoethyl acrylates or methacrylates are optionally quaternized, acrylate or methacrylate monomers comprising a phosphonate or phosphate group, alkyl imidazolidinone (meth) acrylates, polyethylene glycol (meth) acrylates. Preferably the polyethylene glycol group of polyethylene glycol (meth) acrylates has a molecular weight ranging from 400 g/mol to 10 000 g/mol.

With regard to the (meth)acrylic polymer (P2), it is different from the (meth)acrylic polymer (P1). The difference is essentially either the mass average molecular weight or the composition of the polymer or both. The composition means the monomeric composition of both (meth)acrylic polymers (P1) and (P2) in view of the nature of the respective monomers or the quantity of the monomers or both. Either the two polymers have one common monomer and a different comonomer or if the comonomer is the same the relative quantity of said comonomer is different in both (meth)acrylic polymers (P1) and (P2). Preferably the difference is at least 5 wt %, and more preferably 10 wt %.

The (meth)acrylic polymer (P2), it has a mass average molecular weight Mw above 50 000 g/mol, preferably above 60 000 g/mol, more preferably above 70 000 g/mol, still more preferably above 80 000 g/mol, advantageously above 90 000 g/mol, more advantageously above 100 000 g/mol and still more advantageously above 105 000 g/mol and most advantageously above 110 000 g/mol.

The mass average molecular weight Mw of (meth)acrylic polymer (P1) is between 50 000 g/mol and 20 000 000 g/mol, preferable between 60 000 g/mol and 20 000 000 g/mol and more preferably between 70 000 g/mol and 20 000 000 g/mol advantageously between 80 000 g/mol and 15 000 000 g/mol, more advantageously between 90 000 g/mol and 15 000 000 g/mol, even more advantageously between 100 000 g/mol and 10 000 000 g/mol and most advantageously between 105 000 g/mol and 10 000 000 g/mol.

Preferably the (meth)acrylic polymer (P2) has mass average molecular weight Mw more important than the (meth)acrylic polymer (P1). More preferably the difference is at least 10 000 g/mol, still more preferably 20 000 g/mol, advantageously at least 30 000 g/mol.

Preferably the (meth)acrylic polymer (P2) is a copolymer comprising (meth)acrylic monomers. More preferably the (meth)acrylic polymer (P2) is a (meth)acrylic polymer. Still more preferably the (meth)acrylic polymer (P2) comprises at least 50 wt % monomers chosen from C1 to C12 alkyl (meth)acrylates. Advantageously preferably the (meth)acrylic polymer (P2) comprises at least 50 wt % of monomers chosen from C1 to C4 alkyl methacrylate and C1 to C8 alkyl acrylate monomers and mixtures thereof. More advantageously the (meth)acrylic polymer (P2) comprises at least 50 wt % of polymerized methyl methacrylate, even more advantageously at least 60 wt % and most advantageously at least 65 wt %.

Preferably the glass transition temperature Tg of the (meth)acrylic polymer (P2) is between 60° C. and 150° C. The glass transition temperature of the (meth)acrylic polymer (P1) is more preferably between 40° C. and 150° C., advantageously between 45° C. and 150° C. and more advantageously between 50° C. and 150° C.

The (meth)acrylic polymer (P2) is can also be crosslinked. When the (meth)acrylic polymer (P2) is crosslinked it is obvious for one skilled in the art that the before mentioned limitations for the mass average molecular weight Mw interval do not apply.

Preferably the (meth)acrylic polymer (P2) is a continuous phase of the composition. The multistage polymer is a discontinuous phase of the composition. In other words the multistage polymer is dispersed in the (meth)acrylic polymer (P2).

The multistage polymer according to the invention has at least two stages that are different in its polymer composition.

The multistage polymer is preferably in form of polymer particles considered as spherical particles. These particles are also called core shell particles. The first stage forms the core, the second or all following stages the respective shells.

With regard to the polymeric particle according to the invention, which is the primary particle, it has a weight average particle size between 15 nm and 900 nm. Preferably the weight average particle size of the polymer is between 20 nm and 800 nm, more preferably between, more preferably between 25 nm and 600 nm, still more preferably between 30 nm and 550 nm, again still more preferably between 35 nm and 500 nm, advantageously between 40 nm and 400 nm, even more advantageously between 75 nm and 350 nm and advantageously between 80 nm and 300 nm. The primary polymer particles can be agglomerated giving a polymer powder comprising either the multi stage polymer or the (meth)acrylic polymer (P1) and the multi stage polymer.

The polymer particle is obtained by a multistage process such as a process comprising two, three or more stages.

The polymer particle has a multilayer structure comprising at least one layer (A) comprising a polymer (A1) having a glass transition temperature below 0° C. and another layer (B) comprising a polymer (B1) having a glass transition temperature over 30° C.

In a first preferred embodiment the polymer (B1) having a glass transition temperature of at least 30° C. is the external layer of the polymer particle having the multilayer structure.

In a second preferred embodiment the polymer (B1) having a glass transition temperature of at least 30° C. is an intermediate layer of the polymer particle having the multilayer structure, before the multistage polymer is brought into contact with the monomer (M1).

Preferably the stage (A) is the first stage and the stage (B) comprising polymer (B1) is grafted on stage (A) comprising polymer (A1) or another intermediate layer. By first stage is meant that the stage (A) comprising polymer (A1) is made before the stage (B) comprising polymer (B1).

The polymer (A1) having a glass transition temperature below 0° C. in the layer (A) is never made during the last stage of the multistage process. This means that the polymer (A1) is never in the external layer of the particle with the multilayer structure. The polymer (A1) having a glass transition temperature below 0° C. in the layer (A) is either in the core of the polymer particle or one of the inner layers.

Preferably the polymer (A1) having a glass transition temperature below 0° C. in the layer (A) is made in the first stage of the multistage process forming the core for the polymer particle having the multilayer structure and/or before the polymer (B1) having a glass transition temperature over 60° C. Preferably the polymer (A1) is having a glass transition temperature below −5° C., more preferably below −15° C., advantageously below −25° C.

In a first preferred embodiment the polymer (B1) having a glass transition temperature over 60° C. is made in the last stage of the multistage process forming the external layer of the polymer particle having the multilayer structure.

In a second preferred embodiment the polymer (B1) having a glass transition temperature of at least 30° C. is an intermediate layer of the polymer particle having the multilayer structure, is made in a stage after the stage for forming the polymer (A1) of the multistage process.

There could be additional intermediate layer or layers obtained by an intermediate stage or intermediate stages.

Preferably at least a part of the polymer (B1) of layer (B) is grafted on the polymer made in the previous layer. If there are only two stages (A) and (B) comprising polymer (A1) and (B1) respectively, a part of polymer (B1) is grafted on polymer (A1). More preferably at least 50 wt % of polymer (B1) is grafted. The ratio of grafting can be determined by extraction with a solvent for the polymer (B1) and gravimetric measurement before and after extraction to determine the non-grafted quantity.

The glass transition temperature Tg of the respective polymers can be estimated for example by dynamic methods as thermo mechanical analysis.

In order to obtain a sample of the respective polymers (A1) and (B1) they can be prepared alone, and not by a multistage process, for estimating and measuring more easily the glass transition temperature Tg individually of the respective polymers of the respective stages.

With regard to the polymer (A1), in a first embodiment it is a (meth)acrylic polymer comprising at least 50 wt % of monomers from alkyl acrylates.

More preferably the polymer (A1) comprises a comonomer or comonomers which are copolymerizable with alkyl acrylate, as long as polymer (A1) is having a glass transition temperature of less than 0° C.

The comonomer or comonomers in polymer (A1) are preferably chosen from (meth)acrylic monomers and/or vinyl monomers.

The (meth)acrylic comonomer in polymer (A1) comprises monomers chosen from C1 to C12 alkyl (meth)acrylates. Still more preferably (meth)acrylic comonomer in polymer (A1) comprises monomers of C1 to C4 alkyl methacrylate and/or C1 to C8 alkyl acrylate monomers.

Most preferably the acrylic or methacrylic comonomers of the polymer (A1) are chosen from methyl acrylate, propyl acrylate, isopropyl acrylate, butyl acrylate, tert-butyl acrylate, methyl methacrylate, ethyl methacrylate, butyl methacrylate and mixtures thereof, as long as polymer (A1) is having a glass transition temperature of less than 0° C.

Preferably the polymer (A1) is crosslinked. This means that a crosslinker is added to the other monomer or monomers. A crosslinker comprises at least two groups that can be polymerized.

In one specific embodiment polymer (A1) is a homopolymer of butyl acrylate.

In another specific embodiment polymer (A1) is a copolymer of butyl acrylate and at least one crosslinker. The crosslinker presents less than 5 wt % of this copolymer.

More preferably the glass transition temperature Tg of the polymer (A1) of the first embodiment is between −100° C. and 0° C., even more preferably between −100° C. and −5° C., advantageously between −90° C. and −15° C. and more advantageously between −90° C. and −25° C.

With regard to the polymer (A1), in a second embodiment the polymer (A1) is a silicone rubber based polymer. The silicone rubber for example is polydimethyl siloxane. More preferably the glass transition temperature Tg of the polymer (A1) of the second embodiment is between −150° C. and 0° C., even more preferably between −145° C. and −5° C., advantageously between −140° C. and −15° C. and more advantageously between −135° C. and −25° C.

With regard to the polymer (A1), in a third embodiment the polymer (A1) having a glass transition temperature below 0° C. comprises at least 50 wt % of polymeric units coming from isoprene or butadiene and the stage (A) is the most inner layer of the polymer particle having the multilayer structure. In other words the stage (A) comprising the polymer (A1) is the core of the polymer particle.

By way of example, the polymer (A1) of the core of the second embodiment, mention may be made of isoprene homopolymers or butadiene homopolymers, isoprene-butadiene copolymers, copolymers of isoprene with at most 98 wt % of a vinyl monomer and copolymers of butadiene with at most 98 wt % of a vinyl monomer. The vinyl monomer may be styrene, an alkylstyrene, acrylonitrile, an alkyl (meth)acrylate, or butadiene or isoprene. In one embodiment the core is a butadiene homopolymer.

More preferably the glass transition temperature Tg of the polymer (A1) of the third embodiment comprising at least 50 wt % of polymeric units coming from isoprene or butadiene is between −100° C. and 0° C., even more preferably between −100° C. and −5° C., advantageously between −90° C. and −15° C. and even more advantageously between −90° C. and −25° C.

With regard to the polymer (B1), mention may be made of homopolymers and copolymers comprising monomers with double bonds and/or vinyl monomers. Preferably the polymer (B1) is a (meth) acrylic polymer.

Preferably the polymer (B1) comprises at least 70 wt % monomers chosen from C1 to C12 alkyl (meth)acrylates. Still more preferably the polymer (B1) comprises at least 80 wt % of monomers C1 to C4 alkyl methacrylate and/or C1 to C8 alkyl acrylate monomers.

The polymer (B1) can be crosslinked.

Most preferably the acrylic or methacrylic monomers of the polymer (B1) are chosen from methyl acrylate, ethyl acrylate, butyl acrylate, methyl methacrylate, ethyl methacrylate, butyl methacrylate and mixtures thereof, as long as polymer (B1) is having a glass transition temperature of at least 30° C.

Advantageously the polymer (B1) comprises at least 50 wt %, more advantageously at least 60 wt % and even more advantageously at least 70 wt % of monomer units coming from methyl methacrylate.

Preferably the glass transition temperature Tg of the polymer (B1) is between 30° C. and 150° C. The glass transition temperature of the polymer (B1) is more preferably between 50° C. and 150° C., still more preferably between 70° C. and 150° C., advantageously between 90° C. and 150° C. and more advantageously between 90° C. and 130° C.

In another embodiment the multi stage polymer as described previously, has an additional stage, which is the (meth)acrylic polymer (P1). The primary polymer particle according to this embodiment of the invention has a multilayer structure comprising at least one stage (A) comprising a polymer (A1) having a glass transition temperature below 0° C., at least one stage (B) comprising a polymer (B1) having a glass transition temperature over 30° C. and at least one stage (P) comprising the (meth)acrylic polymer (P1) having a glass transition temperature between 30° C. and 150° C.

Preferably the (meth)acrylic polymer (P1) is not grafted on any of the polymers (A1) or (B1).

The (meth)acrylic polymer (P1) and the polymer (B1) are not the same polymer, even if their composition could be very close and some of their characteristics are overlapping. The essential difference is that the polymer (B1) is always part of the multistage polymer.

This is more explained in the process for preparing the composition according to the invention comprising the fibrous material, the (meth)acrylic polymer (P1) and the multi stage polymer.

With regard to the process for manufacturing the multistage polymer according to the invention it comprises the steps of
a) polymerizing by emulsion polymerization of a monomer or monomer mixture ($A_m$) to obtain at least one layer (A) comprising polymer (A1) having a glass transition temperature of less than 0° C.
b) polymerizing by emulsion polymerization of a monomer or monomer mixture ($B_m$) to obtain layer (B) comprising a polymer (B1) having a glass transition temperature of at least 30° C.

the monomer or monomer mixture ($A_m$) and the monomer or monomer mixture ($B_m$) are chosen from monomers according to the composition for polymer (A1) and polymer (B1) given earlier.

Preferably the step a) is made before step b). More preferably step b) is performed in presence of the polymer (A1) obtained in step a), if there are only two stages.

Still more preferably a graftlinking compound is used in order to graft at least a part of the polymer (B1) of step b) on the polymer (A1) of step a).

Advantageously the process for for manufacturing the multistage polymer composition according to the invention is a multistep process comprises the steps one after the other of
a) polymerizing by emulsion polymerization of a monomer or monomer mixture ($A_m$) to obtain one layer (A) comprising polymer (A1) having a glass transition temperature of less than 0° C.
b) polymerizing by emulsion polymerization of a monomer or monomer mixture ($B_m$) to obtain layer (B) comprising a polymer (B1) having a glass transition temperature of at least 30° C.

The respective monomers or monomer mixtures ($A_m$) and ($B_m$) for forming the layers (A) and (B) respectively comprising the polymers (A1) and (B1) respectively and the characteristics of the respective polymers (A1) and (B1) are the same as defined before.

Still more advantageously a graftlinking compound is used in order to graft at least a part of the polymer (B1) of step b) on the polymer (A1) of step a).

The process for manufacturing the multistage polymer can comprise additional steps for additional stages between the steps a) and b).

The process for manufacturing the multistage polymer can also comprise additional steps for additional stages before the steps a) and b). A seed could be used for polymerizing by emulsion polymerization the monomer or monomers mixture ($A_m$) to obtain the layer (A) comprising polymer (A1) having a glass transition temperature of less than 0° C. The seed is preferably a thermoplastic polymer having a glass transition temperature of at least 20° C.

The multistage polymer is obtained as an aqueous dispersion of the polymer particles. The solid content of the dispersion is between 10 wt % and 65 wt %.

With regard to the process for manufacturing the (meth)acrylic polymer (P1) according to the invention is comprises the step of polymerizing the respective (meth)acrylic monomers ($P1_m$). The respective (meth)acrylic monomers ($P1_m$) are the same as defined before for the the (meth)acrylic polymer (P1) and two preferred embodiments the (meth)acrylic polymer (P1).

The (meth)acrylic homo or copolymer (P1) could be made in batch or semi-continuous process:
for the batch process, the mixture of monomers is introduced in one shot just before or after introduction of one or part of the initiator system
for the semi-continuous process, the monomer mixture is added in multiple shots or continuously in parallel to the initiator addition (the initiator is also added in multiple shots or continuously) during a defined period of addition which could be in the range 30 to 500 min.

The process for preparing the polymer composition comprising the (meth)acrylic polymer (P1) and the multi stage polymer has two preferred embodiments.

In a first preferred embodiment of the process, the (meth)acrylic polymer (P1) is polymerized in the presence of the multistage polymer. The (meth)acrylic polymer (P1) is made as an additional stage of the multistage polymer. The (meth)acrylic polymer (P1) is a layer on the multistage polymer and as it is an additional layer it is the outer layer on top of the multistage polymer. The (meth)acrylic polymer (P1) is not grafted on the multistage polymer.

In a second preferred embodiment of the process, the (meth) acrylic polymer (P1) is polymerized apart and mixed or blended with the multistage polymer.

With regard to the process according to the first preferred embodiment for preparing the polymer composition comprising the (meth)acrylic polymer (P1) and the multi stage polymer, it comprises the steps of
- a) polymerizing by emulsion polymerization of a monomer or monomer mixture ($A_m$) to obtain one layer in stage (A) comprising polymer (A1) having a glass transition temperature of less than 0° C.,
- b) polymerizing by emulsion polymerization of a monomer or monomer mixture ($B_m$) to obtain layer in stage (B) comprising a polymer (B1) having a glass transition temperature of at least 30° C.,
- c) polymerizing by emulsion polymerization of a monomer or monomer mixture ($P1_m$) to obtain a layer in this additional stage comprising the (meth)acrylic polymer (P1) having a glass transition temperature of at least 30° C., characterized that the (meth)acrylic polymer (P1) has a mass average molecular weight Mw of less than 100 000 g/mol.

Preferably the step a) is made before step b).

More preferably step b) is performed in presence of the polymer (A1) obtained in step a). Still more preferably a graftlinking compound is used in order to graft at least a part of the polymer (B1) of step b) on the polymer (A1) of step a).

Advantageously the method for for manufacturing the polymer composition comprising the (meth)acrylic polymer (P1) and the multi stage polymer is a multistep process and comprises the steps one after the other of
- a) polymerizing by emulsion polymerization of a monomer or monomer mixture ($A_m$) to obtain one layer in stage (A) comprising polymer (A1) having a glass transition temperature of less than 0° C.,
- b) polymerizing by emulsion polymerization of a monomer or monomer mixture ($B_m$) to obtain layer in stage (B) comprising a polymer (B1) having a glass transition temperature of at least 30° C.,
- c) polymerizing by emulsion polymerization of a monomer or monomer mixture ($P1_m$) to obtain a layer in this additional stage comprising the (meth)acrylic polymer (P1) having a glass transition temperature of at least 30° C., characterized that the (meth)acrylic polymer (P1) has a mass average molecular weight Mw of less than 100 000 g/mol.

Still more advantageously a graftlinking compound is used in order to graft at least a part of the polymer (B1) of step b) on the polymer (A1) of step a).

The respective monomers or monomer mixtures ($A_m$), ($B_m$) and ($P1_m$) for forming the layers (A), (B) and additional stage respectively comprising the polymers (A1), (B1) and (P1) respectively, are the same as defined before. The characteristics of the polymers (A1), (B1) and (P1) respectively, are the same as defined before.

Preferably the method for manufacturing the polymer composition comprising the (meth)acrylic polymer (P1) and the multi stage polymer comprises the additional step d) of recovering of this polymer composition.

By recovering is meant partial or separation between the aqueous and solid phase, latter comprises the polymer composition.

More preferably according to the invention the recovering of the polymer composition is made by coagulation or by spray-drying.

Spray drying is the preferred method for the recovering and/or drying for the manufacturing method for a polymer powder composition if the polymer (A1) having a glass transition temperature below 0° C. comprises at least 50 wt % of polymeric units coming from alkyl acrylate and the stage (A) is the most inner layer of the polymer particle having the multilayer structure.

Coagulation is the preferred method for the recovering and/or drying for the manufacturing method for a polymer powder composition according to the present invention if the polymer (A1) having a glass transition temperature below 10° C. comprises at least 50 wt % of polymeric units coming from isoprene or butadiene and the stage (A) is the most inner layer of the polymer particle having the multilayer structure.

The method for manufacturing the polymer composition according to the invention can comprise optionally the additional step e) of drying of the polymer composition.

Preferably the drying step e) is made if the step d) of recovering of the polymer composition is made by coagulation.

Preferably after the drying step an e) the polymer composition comprises less than 3 wt %, more preferably less than 1.5 wt % advantageously less than 1% of humidity or water.

The humidity of a polymer composition can be measure with a thermo balance.

The drying of the polymer can be made in an oven or vacuum oven with heating of the composition for 48 hours at 50° C.

With regard to the process according to the second preferred embodiment for preparing the polymer composition comprising the (meth)acrylic polymer (P1) and the multi stage polymer, it comprises the steps of
- a) mixing of the (meth)acrylic polymer (P1) and the multi stage polymer
- b) recovering the obtained mixture of previous step in form of a polymer powder wherein the (meth)acrylic polymer (P1) and the multi stage polymer in step a) are in form of a dispersion in aqueous phase.

The quantities of the aqueous dispersion of the (meth) acrylic polymer (P1) and the aqueous dispersion of the multi stage polymer are chosen in a way that the weight ratio of the multi stage polymer based on solid part only in the obtained mixture is at least 5 wt %, preferably at least 10 wt %, more preferably at least 20 wt % and advantageously at least 50 wt %.

The quantities of the aqueous dispersion of the (meth) acrylic polymer (P1) and the aqueous dispersion of the multi stage polymer are chosen in a way that the weight ratio of the multi stage polymer based on solid part only in the obtained mixture is at most 99 wt %, preferably at most 95 wt % and more preferably at most 90 wt %.

The quantities of the aqueous dispersion of the (meth) acrylic polymer (P1) and the aqueous dispersion of the multi stage polymer are chosen in a way that the weight ratio of the multi stage polymer based on solid part only in the obtained mixture is between 5 wt % and 99 wt %, preferably between 10 wt % and 95 wt % and more preferably between 20 wt % and 90 wt %.

The recovering step b) of the process for manufacturing the polymer composition comprising the (meth)acrylic polymer (P1) and the multi stage polymer, is preferably made by coagulation or by spray drying.

The process for manufacturing the polymer composition comprising the (meth)acrylic polymer (P1) and the multi stage polymer can optionally comprise the additional step c) for drying the polymer composition.

By dry is meant that the polymer composition according to the present invention comprises less than 3 wt % humidity and preferably less than 1.5 wt % humidity and more preferably less than 1.2 wt % humidity.

The humidity can be measured by a thermo balance that heats the polymer composition and measures the weight loss.

The process for manufacturing the polymer composition comprising the (meth)acrylic polymer (P1) and the multi stage polymer yields preferably to a polymer powder. The polymer powder of the invention is in form of particles. A polymer powder particle comprises agglomerated primary polymer particles made by multistage process and the (meth) acrylic polymer (P1).

With regard to the polymer powder comprising the (meth) acrylic polymer (P1) and the multi stage polymer according to the two embodiments of the process of preparation, it has a volume median particle size D50 between 1 μm and 500 μm. Preferably the volume median particle size of the polymer powder is between 10 μm and 400 μm, more preferably between 15 μm and 350 μm and advantageously between 20 μm and 300 μm.

The D10 of the particle size distribution in volume is at least 7 μm and preferably 10 μm.

The D90 of the particle size distribution in volume is at most 950 μm and preferably 500 μm, more preferably at most 400 μm.

The weight ratio r of the (meth)acrylic polymer (P1) in relation to the multi stage polymer is at least 5 wt %, more preferably at least 7 wt % and still more preferably at least 10 wt %.

According to the invention the ratio r of the (meth) acrylic polymer (P1) in relation to the multi stage polymer is at most 95 w %.

Preferably the weight ratio of the (meth)acrylic polymer (P1) in relation to the multi stage polymer is between 5 wt % and 95 wt % and preferably between 10 wt % and 90 wt %.

With regard to the process for manufacturing the polymeric composition of the invention there are two preferred processes.

The first preferred process for manufacturing the polymeric composition of the invention comprises the steps of
a) preparing a composition comprising a (meth)acrylic polymer (P1) having a mass average molecular weight Mw of less than 100 000 g/mol and a multi stage polymer,
b) mixing the composition of previous step with a (meth) acrylic polymer (P2).

The preparation of the composition comprising a (meth) acrylic polymer (P1) having a mass average molecular weight Mw of less than 100 000 g/mol and a multi stage polymer has been described before.

Preferably mixing is made by blending. Blending can be made for example in an extruder.

The composition obtained by first preferred process for manufacturing the polymeric composition can be in form of a powder or beads of granules, which can be further transformed for example into articles.

The second preferred process for manufacturing the polymeric composition of the invention comprises the steps of
a) preparing a composition comprising a (meth)acrylic polymer (P1) having a mass average molecular weight Mw of less than 100 000 g/mol and a multi stage polymer,
b) mixing the composition of previous step with a monomer (M1) chosen from a (meth)acrylic monomer or a vinyl monomer or mixture thereof;
c) polymerizing the monomer (M1).

The polymerization of the monomer (M1) yields to the (meth) acrylic polymer (P2).

Before polymerizing in step c) an initiator can be added to the composition of step b). In one embodiment an initiator has to be added to the composition.

The preparation of the composition comprising a (meth) acrylic polymer (P1) having a mass average molecular weight Mw of less than 100 000 g/mol and a multi stage polymer has been described before.

Before polymerizing a liquid composition is obtained in step b).

With regard to the monomer (M1) it is a liquid monomer at least in the temperature range between 0° C. and 60° C. The (meth)acrylic monomer (M1) comprises one carbon C=C double bond.

Preferably the monomer (M1) chosen from a (meth) acrylic monomer or a vinyl monomer or mixture thereof.

The monomer (M1) according to the invention is a monomer that is a solvent for the (meth)acrylic polymer (P1). In other word the (meth)acrylic polymer (P1) is soluble in the monomer (M1).

Soluble means that in a certain time the (meth)acrylic polymer (P1) in contact the thermodynamically compatible monomer (M1) is dissolved and a solution of the (meth) acrylic polymer (P1) in the monomer (M1) is obtained.

The solubility of the (meth)acrylic polymer (P1) in the monomer (M1) can be simply tested by mixing under agitation at 25° C. the two compounds. For one skilled in the art the solvents including monomers as monomer (M1) for a large number of polymers are known. On the other hand solubility parameter values are given for a large number of polymer and solvents, latter including a large number of monomers for example in Polymer Handbook (4$^{th}$ edition) Ed. J. Brandrup, E. H. Immergut and E. A. Grulke; Pub.: John Wiley and Sons Inc. 1999, Chapter "Solubility Parameter Value" by Eric A. Gulke VII/675 to VII/714.

The monomer (M1) is preferably chosen from (meth) acrylic monomers and mixtures thereof or therewith, latter comprising at least 50 wt % of (meth)acrylic monomers in the mixture. If the (meth)acrylic monomer (M1) is a mixture of several monomers, the (meth)acrylic polymer (P1) is soluble in the mixture comprising the (meth)acrylic monomer(s) (M1).

The (meth)acrylic monomer (M1) is more preferably chosen from acrylic acid, methacrylic acid, alkyl acrylic monomers, alkyl methacrylic monomers and mixtures thereof.

Still more preferably the (meth)acrylic monomer (M1) is chosen from acrylic acid, methacrylic acid, alkyl acrylic monomers, alkyl methacrylic monomers and mixtures thereof, the alkyl group having from 1 to 22 carbons, either linear, branched or cyclic; preferably the alkyl group having from 1 to 12 carbons, either linear, branched or cyclic.

Advantageously the (meth)acrylic monomer (M1) is chosen from methyl methacrylate, ethyl methacrylate, methyl acrylate, ethyl acrylate, methacrylic acid, acrylic acid, n-butyl acrylate, iso-butyl acrylate, n-butyl methacrylate, iso-butyl methacrylate, cyclohexyl acrylate, cyclohexyl methacrylate, isobornyl acrylate, isobornyl methacrylate and mixtures thereof.

In a first most advantageously embodiment at least 50 wt %, preferably at least 60 wt % of the (meth)acrylic monomer (M1) is methyl methacrylate.

In a second most advantageously at least 50 wt %, preferably at least 60 wt %, more preferably at least 70 wt % and advantageously at least 80 wt % and even more advantageously 90 wt % of the (meth)acrylic monomer (M1)

is a mixture of methyl methacrylate with alkyl acrylate having an C1 to C4 alkyl group.

The liquid composition of step b) of the second preferred process for manufacturing the polymeric composition of the invention that is less viscous than a composition not comprising the (meth)acrylic polymer (P1).

The liquid composition of step b) for manufacturing the polymeric composition of the invention can be used to prepare a better dispersed and high amount of multistage polymer instead of a composition not comprising the (meth) acrylic polymer (P1).

The liquid composition is having a dynamic viscosity at 20° C. between 10 mPa·s and 200 000 mPa·s at a shear rate of 1 s$^{-1}$.

The second preferred process for manufacturing the polymeric composition of the invention includes a process for the preparation of cast sheets made of (meth)acrylic polymer (P2) which are impact-reinforced using multistage polymer and comprise (meth)acrylic polymer (P1) as well.

The process comprises the following stages:
1. preparing preparing a composition comprising a (meth) acrylic polymer (P1) having a mass average molecular weight Mw of less than 100 000 g/mol and a multi stage polymer;
2. mixing the composition comprising a (meth)acrylic polymer (P1) having a mass average molecular weight Mw of less than 100 000 g/mol and a multi stage polymer stage 1 with monomer (M1), for example methyl methacrylate and optionally crosslinking agent, optionally at least one comonomer M and at least one radical initiator;
3. casting the mixture obtained in stage 2 in a mold and then heating it according to a temperature cycle in order to obtain a cast sheet.

As regards the radical initiator, it can be chosen from diacyl peroxides, peroxyesters, dialkyl peroxides, peroxyacetals or azo compounds. Radical initiators which may be suitable are, for example, isopropyl carbonate, benzoyl peroxide, lauroyl peroxide, caproyl peroxide, dicumyl peroxide, tert-butyl perbenzoate, tert-butyl per-2-ethylhexanoate, cumyl hydroperoxide, 1,1-di(tert-butylperoxy)-3,3,5-trimethylcyclohexane,tert-butyl peroxyisobutyrate, tert-butyl peracetate, tert-butyl perpivalate, amyl perpivalate, 1,1-di(t-amylperoxy)cyclohexane, tert-butyl peroctoate, azodiisobutyronitrile (AIBN), azodiisobutyramide, 2,2'-azo-bis(2,4-dimethylvaleronitrile), 4,4'-azobis(4-cyano-pentanoic acid) or 1,1'-azobis(cyanocyclohexane). It would not be departing from the scope of the invention to use a mixture of radical initiators chosen from the above list. The preferred radical initiator is 1,1-di(t-amylperoxy)cyclohexane.

The content of radical initiator with respect to the monomers of the mixture which is cast in the mold varies from 100 to 2000 ppm by weight, preferably between 200 and 1000 ppm by weight. This content can vary as a function of the application and of the thickness targeted.

The sheet is having a thickness between 0.5 mm and 300 mm, preferably between 1 mm and 200 mm.

The sheets manufactured according to the present invention can be used as windows, noise-reducing walls, flat screens, and the like, or else can be converted to various articles by thermoforming, cutting out, polishing, adhesive bonding or folding. These sheets can be used in particular to manufacture bathroom fittings (baths, sinks, shower trays, and the like). For this, the sheets are thermoformed in a way known to a person skilled in the art.

Still another aspect of the present invention is the manufacture of impact modified polymeric articles.

Methods of Evaluation

Viscosity Measurements

The viscosity is measured with a MCR 301 rheometer from Anton Paar. Couette geometry is used. Temperature is 20° C. and with a shear rate from 0.1 s−1 to 100 s−1.

Glass Transition Temperature

The glass transitions (Tg) of the polymers are measured with equipment able to realize a thermo mechanical analysis. A RDAII "RHEOMETRICS DYNAMIC ANALYSER" proposed by the Rheometrics Company has been used. The thermo mechanical analysis measures precisely the viscoelastics changes of a sample in function of the temperature, the strain or the deformation applied. The apparatus records continuously, the sample deformation, keeping the stain fixed, during a controlled program of temperature variation. The results are obtained by drawing, in function of the temperature, the elastic modulus (G'), the loss modulus and the tan delta. The Tg is higher temperature value read in the tan delta curve, when the derived of tan delta is equal to zero.

Molecular Weight

The mass average molecular weight (Mw) of the polymers is measured with by size exclusion chromatography (SEC).

Particle Size Analysis

The particle size of the primary particles after the multistage polymerization is measured with a Zetasizer.

The particle size of the polymer powder after recovering is measured with Malvern Mastersizer 3000 from MALVERN. For the estimation of weight average powder particle size, particle size distribution and ratio of fine particles a Malvern Mastersizer 3000 apparatus with a 300 mm lenses, measuring a range from 0.5-880 μm is used.

EXAMPLES

Synthesis of multistage polymer (core-shell particles) is made according to the example of sample 1 of WO2012/038441 in order to obtain a multistage polymer. The multistage polymer CS1 is obtained. It comprises a stage (A) comprising a polymer (A1) having a glass transition temperature of less than 0° (essentially made of butyl acrylate) and a stage (B) comprising a polymer (B1) having a glass transition temperature of at least 30° C. (essentially made of methyl methacrylate). The obtained multistage polymer (CS1) is kept as an aqueous dispersion for further use.

Synthesis of a (meth)arylic polymer type (P1) is made according to two embodiments: first the (meth)acrylic polymer (P1) is polymerized in the presence of the multistage polymer CS1. The (meth)acrylic polymer (P1) is made as an additional stage of the multistage polymer CS. And in a second embodiment the (meth) acrylic polymer (P1) is polymerized apart and mixed or blended with the multistage polymer after the end of polymerization of the (meth)acrylic polymer (P1).

Comparative Example 1

The multistage polymer CS1 is dried and mixed with methyl methacrylate (MMA) at 20° C. under agitation, so that 20 wt % of CS1 relatively to MMA are in the liquid composition.

Example 1

The (meth)acrylic polymer (P1) is made as an additional third stage on the multistage polymer CS1. The mass average molecular weight of the (meth)arylic polymer P1 is $M_w$=28 000 g/mol. The (meth)acrylic polymer P1 represents 10 wt % of the composition comprising CS1+P1. The dried polymer composition comprising the three stages is mixed with methyl methacrylate (MMA) at 20° C. under agitation so that 20 wt % of CS1+ P1 relatively to MMA are in the liquid composition.

Example 2

The dried polymer composition comprising the three stages as in example 1 is mixed with methyl methacrylate (MMA) at 20° C. under agitation so that 25 wt % of CS1+P1 relatively to MMA are in the liquid composition.

The viscosity of the respective liquid compositions is measured.

TABLE 1 viscosity results

| Example | Sample | Dynamic Viscosity at 20° C. [Pa*s] at 1 s$^{-1}$ | Solid content of polymers (CS1 + P1) in composition [wt %] |
|---|---|---|---|
| Comparative Example 1 | With multistage polymer | 5.3 | 20 |
| Example 1 | With multistage polymer and P1 | 1.4 | 20 |
| Example 2 | With multistage polymer and P1 | 12.4 | 25 |

As shown in table 1 relatively high quantity of multi stage polymer in form of core shell particles can be introduced in the liquid composition having at the same time the (meth) acrylic polymer (P1), while the viscosity.

The core shell particles can be introduced at 20 wt % and higher.

The liquid compositions of example 1 and 2 can be used in a cast sheet process for producing impact modified cast sheets.

The invention claimed is:

1. A polymeric composition comprising
A. a (meth)acrylic polymer (P1), wherein said (meth) acrylic polymer (P1) comprises at least 50 wt % monomers chosen from C1 to C12 alkyl (meth)acrylates,
B. a multistage, core-shell polymer and
C. a (meth)acrylic polymer (P2), which is different from the (meth)acrylic polymer (P1), in either the mass average molecular weight, the composition of the polymer, or both, and wherein the (meth)acrylic polymer (P2) has a mass average molecular weight Mw above 50,000 g/mol,
wherein the (meth)acrylic polymer (P1) has a mass average molecular weight Mw of less than 100,000 g/mol as measured by mass average molecular weight (Mw) of the polymers is measured with by size exclusion chromatography (SEC), and wherein the multi stage polymer comprises
a) one stage (A) comprising a polymer (A1) having a glass transition temperature of less than 0° C., and
b) one stage (B) comprising a polymer (B1) having a glass transition temperature of at least 30° C.

2. The composition according to claim 1, wherein the (meth) acrylic polymer (P1) has a mass average molecular weight Mw between 5000 g/mol and 70,000 g/mol.

3. The composition according to claim 1, wherein the (meth)acrylic polymer (P2) has a mass average molecular weight Mw higher than that of the (meth)acrylic polymer (P1).

4. The composition according to claim 1, wherein the (meth)acrylic polymer (P2) has a mass average molecular weight Mw between 105,000 g/mol and 10,000,000 g/mol.

5. The composition according to claim 1, wherein the (meth)acrylic polymer (P2) is crosslinked.

6. The composition according to claim 1, wherein the the glass transition temperature Tg of the (meth)acrylic polymer (P2) is between 60° C. and 150° C. as measured by thermo mechanical analysis.

7. The composition according to claim 1, wherein the (meth)acrylic polymer (P2) comprises at least 50 wt % of polymerized methyl methacrylate.

8. The composition according to claim 1, wherein the stage (A) is the first stage and that stage (B) comprising polymer (B1) is grafted on stage (A) comprising polymer (A1).

9. The composition according to claim 1, wherein the polymers (A1) and (B1) are acrylic or methacrylic polymers.

10. The composition according to claim 1, wherein the polymer (A1) comprises at least 50 wt % of polymeric units coming from isoprene or butadiene.

11. The composition according to claim 1, wherein the (meth) acrylic polymer (P1) comprises at least 50 wt % monomers selected from the group comprising C1 to C12 alkyl (meth)acrylates.

12. The composition according to claim 1, wherein the (meth) acrylic polymer (P1) comprises from 50 wt % to 100 wt % methyl methacrylate, and from 0.2 wt % to 20 wt % of at least one C1 to C8 alkyl acrylate monomer.

13. The composition according to claim 1, wherein the (meth) acrylic polymer (P1) comprises between 0 wt % and 50 wt % of a functional comonomer, wherein said comonomer has the formula (1) or (2):

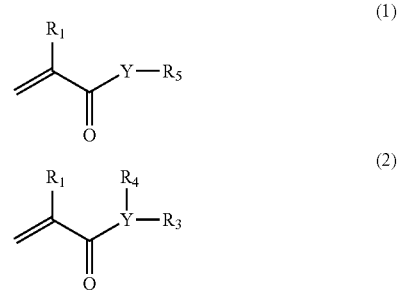

wherein in both formulas (1) and (2) $R_1$ is chosen from H or $CH_3$; and in formula (1) Y is O, $R_5$ is H or an aliphatic or aromatic radical having at least one atom that is not C or H; and in formula (2) Y is N and $R_4$ and/or $R_3$ is H or an aliphatic or aromatic radical.

14. The composition according to claim 13, wherein the (meth)acrylic polymer (P1) comprises between 1 wt % and 30 wt % of a functional monomer.

15. The composition according to claim 13, wherein the functional comonomer is selected from the group consisting of glycidyl (meth)acrylate, acrylic acid, methacrylic acid, the amides derived from acrylic and methacrylic acid dimethylacrylamide, 2-methoxyethyl acrylate, 2-methoxyethyl methacrylate, 2-aminoethyl acrylates optionally quaternized, 2-aminoethyl methacrylates optionally quaternized, acrylate or methacrylate monomers comprising a phosphonate or phosphate group, alkyl imidazolidinone (meth) acrylates, polyethylene glycol (meth) acrylates.

16. An impact modified polymeric article comprising polymeric composition according to claim 1.

* * * * *